US006482020B1

(12) United States Patent
Yeh

(10) Patent No.: US 6,482,020 B1
(45) Date of Patent: Nov. 19, 2002

(54) MEMORY CARD CONNECTOR WITH AN EJECTING MECHANISM

(75) Inventor: Ryan Yeh, Chino Hills, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/033,262

(22) Filed: Dec. 26, 2001

(51) Int. Cl.⁷ .............................................. H01R 13/62
(52) U.S. Cl. ..................................................... 439/159
(58) Field of Search ................................ 439/159, 160, 439/152–158

(56) References Cited

U.S. PATENT DOCUMENTS

| | | | | |
|---|---|---|---|---|
| 5,890,920 A | * | 4/1999 | David et al. | 439/159 |
| 5,967,810 A | * | 10/1999 | Spickler et al. | 439/159 |
| 5,993,227 A | * | 11/1999 | Hsia et al. | 439/159 |
| 6,059,587 A | * | 5/2000 | Ho et al. | 439/159 |
| 6,095,835 A | * | 8/2000 | Oguchi | 439/159 |
| 6,102,720 A | * | 8/2000 | Tung | 439/159 |

* cited by examiner

Primary Examiner—Gary Paumen
(74) Attorney, Agent, or Firm—Wei Te Chung

(57) ABSTRACT

A memory card connector (100) for soldering to a printed circuit board (PCB) includes a U-shaped shell (1), an insulative frame (2), a plurality of conductive contacts (3) partially retained in the insulative frame and an ejecting mechanism. The ejecting mechanism includes a first device (61) for movement with an inserted memory card and a second device (62) for ejecting the memory card. The first device includes an eject metal (612), a slide bar (611) integral with the eject metal, a first cam (614) and a first cam follower (615). The second device includes a push bar (621), a control rod (626), a second cam (624) and a second cam follower (625). By the interoperation of the first device and the second device, the push bar is operable to eject the memory card while at the same time being locked to a forward concealed position.

13 Claims, 5 Drawing Sheets

MEMORY CARD CONNECTOR WITH AN EJECTING MECHANISM

FIELD OF THE INVENTION

The present invention relates to an electrical connector, and particularly to a memory card connector with an ejecting mechanism for use in a portable electronic device.

BACKGROUND OF THE INVENTION

Digital media is now downloadable to portable electronic devices that contain a memory card for storage purpose. In the prior art, the memory card connector has an ejector system attached on a side of a frame of the memory card connector for ejecting the memory card out of a receiving space defined in the connector. For insertion of a memory card, a rear end thereof is held by a user with a front end thereof pushing an eject metal for a certain distance until the memory card is completely inserted into the receiving space. The user then must push the rear end of the memory card to move the eject metal to eject the front end of the memory card, thereby successfully pulling the memory card out of the receiving space. However, the size of the memory card is too small for the user to conveniently operate the rear end of the memory card when the card is completely received into the receiving space.

On the other hand, a conventional card connector as disclosed in U.S. Pat. No. 6,095,835 has a push rod in the ejector secured to a side of the card connector for ejecting the card. In this prior art, when pushing the push rod to urge a transmission pin to move a driving plate forward, an eject arm interlocked with the driving plate rotates about a first support shaft, making the claws of a first and a second rotary arms press front end of the card and eject the memory card. However, a disadvantage of this conventional card connector is that the push rod and the driving plate are designed as plate-shaped. So a total height of the connector is too large in view of a miniaturization trend of the connector. Moreover, the eject arm need rotate on the first support shaft and urge the first and second rotary arms to eject the card, so the ejector is complicated as to assembling operation.

Hence, an improved memory card connector is needed to overcome the above-mentioned deficiencies of current memory card connectors.

SUMMARY OF THE INVENTION

Accordingly, the object of the present invention is to provide a memory card connector which has a comparatively low profile.

Another object of the present invention is to provide a memory card connector having a simple ejecting mechanism for withdrawing a memory card from the connector.

To achieve the above objects, a memory card connector in accordance with the present invention for soldering to a printed circuit board (PCB) comprises a U-shaped shell protrudes a projecting tab from one side arm of the shell, an insulative frame having a first insulative housing and a second insulative housing, a plurality of conductive contacts partially retained in the first insulative housing and an ejecting mechanism. The ejecting mechanism comprises includes a first device and a second device. Wherein the first device includes a slide bar, a eject metal formed from one piece of metal blank with the slide bar, a first spring, a first cam, and a first cam follower. The second device includes a push bar, a second spring, a third spring, a second cam, a second cam follower, a control rod and a cap.

During inserting the memory card into the receiving space, the card pushes the eject metal and urges the slide bar to slide forwardly. Meanwhile the first cam follower slides from the original position to the locked position of the first cam and, upon releasing the pushing force on the card, is locked, thereby locking the eject metal to the cam follower. This completes insertion of the memory card. To eject the memory card, the push bar is pressed so the control rod loaded in the push bar impacts the slide bar and drags it to slide forwardly until the control rod contacts with the projecting tab of the shell and is squeezed into the push bar. At the same time and within the short distance that the slide bar slides ahead, the first cam follower is urged to slide along the first cam from the locked position to the furthest position and back to the original position, therefore the memory card is ejected. Moreover, the push bar is locked to the second cam. Pressing the push bar again, the push bar will bring it back to its original position for another service.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
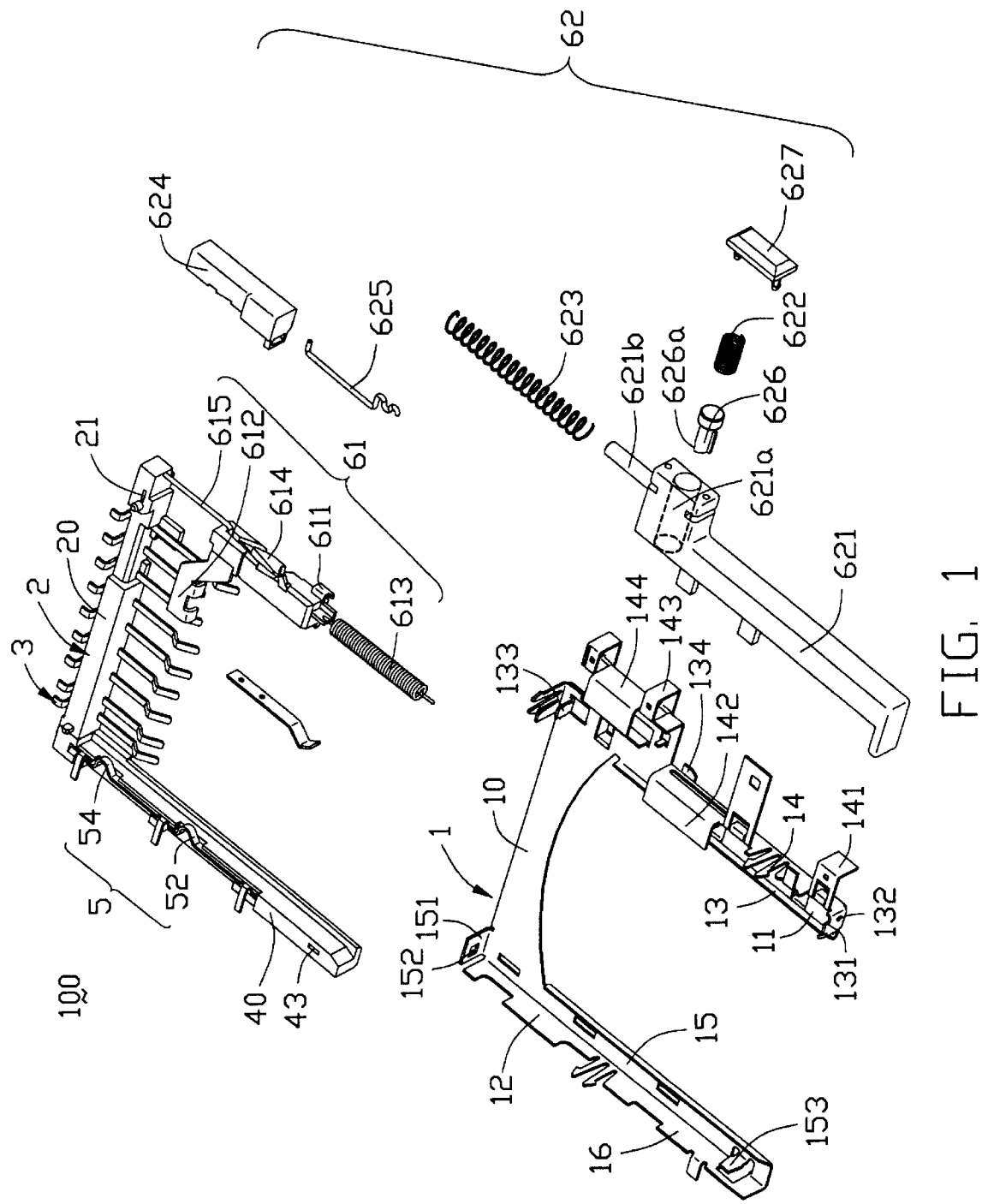
FIG. 1 is an exploded view of a memory card connector in accordance with the present invention.
Figure 2:
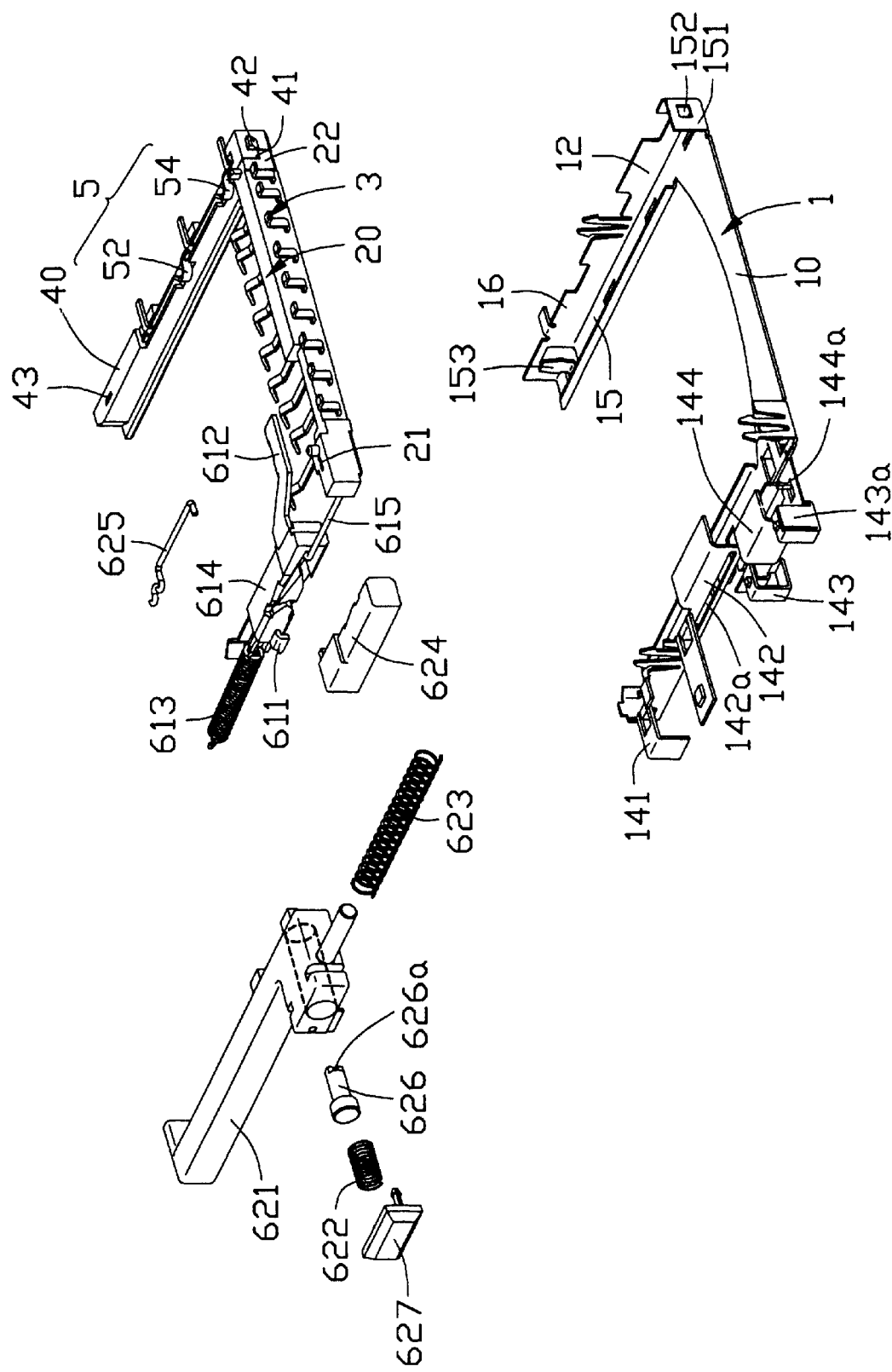
FIG. 2 is another exploded view of the memory card connector of FIG. 1.
Figure 3:
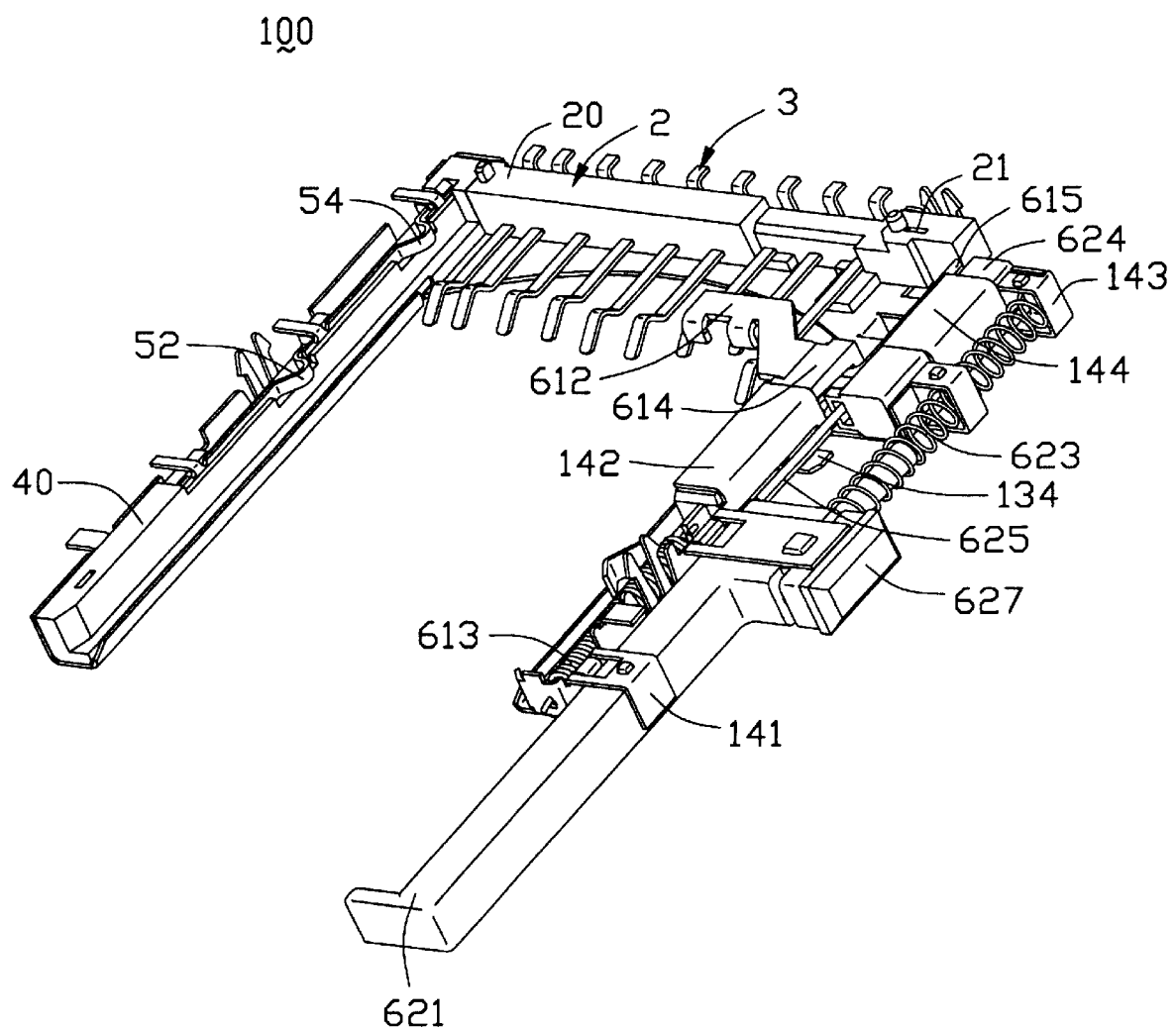
FIG. 3 is an assembled view of the memory card connector of FIG. 1.
Figure 4:
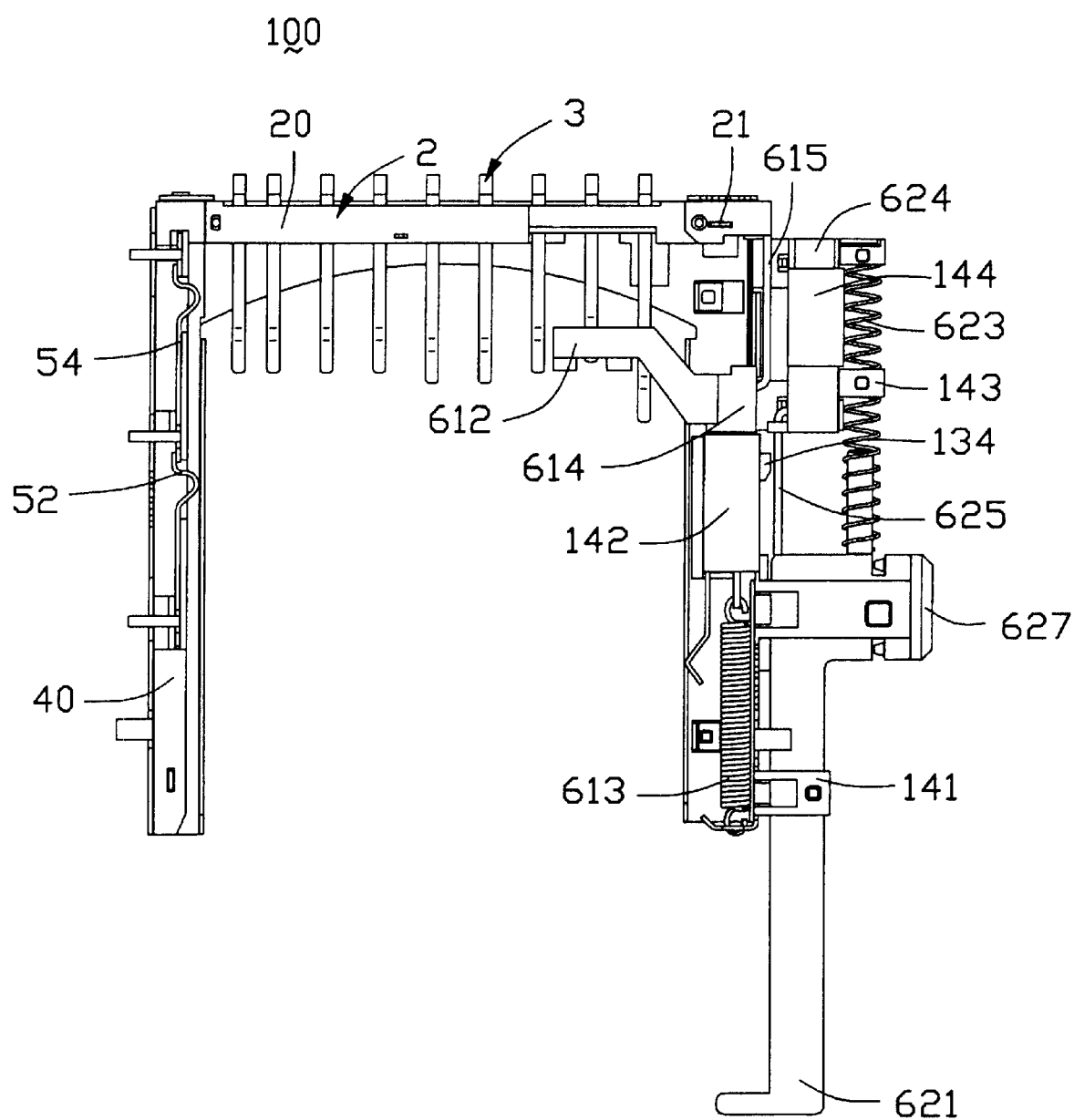
FIG. 4 is a top view of the memory card connector of FIG. 3.

Referring to FIGS. 1, 2 and 3, a memory card connector 100 in accordance with the present invention comprises a U-shaped shell 1, an insulative frame 2 assembled on the shell 1, a plurality of conductive contacts 3 partially retained in the insulative frame 2 for soldering to a printed circuit board (PCB) (not shown), a plurality of switch contacts 5 secured to the insulative frame 2 and an ejecting mechanism secured to the shell 1. The memory card connector 100 is soldered to the PCB for insertion of a memory card (not shown), thereby establishing electrical connection between the PCB and the memory card.

The shell 1 includes a first and a second side arms 11, 12 parallel to each other and a base 10 connecting front ends of the first and the second side arms 11, 12. The side arms 11, 12, the base 10 and a surface of the PCB together define a receiving space for insertion of the memory card.

The first side arm 11 comprises a first bottom wall 13 and a first side wall 14 perpendicularly extending from the first bottom wall 13. The first bottom wall 13 upwardly forms a first securing tab 131 at a rear end thereof. The first securing tab 131 defines a securing hole 132 therein. The first bottom wall 13 also forms an upwardly extending first clip 133 at a front end thereof. A projecting tab 134 protrudes outwardly from the bottom wall 13 and a bevel (not labeled) is formed at the front end thereof. The first side wall 14 extends outwardly to form a first securing portion 141 at a rear end thereof and extends inwardly to form a second securing portion 142. The second securing portion 142 defines a slot 142*a* therein. A front and a rear securing portions 143 are also formed on the first side arm 11. The front securing portion 143 further forms a first stopping tab 143*a*. A third securing portion 144 is formed between the two securing portions 143. Two second stopping tabs 144*a* protrude upwardly beside the third securing portion 144.

The second side arm 12 comprises a second bottom wall 15 and a second side wall 16 perpendicularly extending from the second bottom wall 15. The second bottom wall 15 upwardly forms a second clip 153 at a rear end thereof and a second securing tab 151 at a front end thereof, wherein the second securing tab 151 defines a second securing hole 152 therein.

The insulative frame 2 has a first insulative housing 20 and a second insulative housing 40. The first insulative housing 20 has an elongate configuration and defines a first receiving slot 21 at one end thereof corresponding to the first clip 133, and a first protruding block 22 on the other end thereof. The second insulative housing 40 defines a second receiving slot 43 corresponding to the second clip 153 of the second side arm 12. A recess 41 is defined in the second insulating housing 40 corresponding to the first protruding block 22 of the first insulative housing 20. The second insulative housing 40 further forms a second protruding block 42 corresponding to the second securing hole 152 of the second side arm 12 of the shell 1.

The switch contacts 5 comprises a first and a second contacts 52, 54 which are secured to the second insulative housing 40.

The ejecting mechanism includes a first device 61 and a second device 62. The first device 61 includes a slide bar 611, an eject metal 612 formed from one piece of metal blank with the slide bar 611, a first spring 613 secured at one end thereof to the first securing hole 132 of the first side arm 11, a first cam 614, and a first cam follower 615 secured to one end of the first insulative housing 20 and extending from the first insulative housing 20 in a direction opposite to an insertion direction of the memory card. The second device 62 includes a push bar 621, a second spring 622, a third spring 623, a second cam 624, a second cam follower 625, a control rod 626 and a cap 627. The push bar 621 forms a chamber 621*a* at a front end thereof. A post 621*b* protrudes forwardly from the front end. The control rod 626 is one piece of metal and a notch 626*a* is defined at the front end thereof. Moreover the control rod 626 is mounted in the chamber 621*a* with the third spring 623 compressed between it and the cap 627.

Referring to FIG. 3, in assembly, the first insulative housing 20 is secured to the base 10 of the shell 1, wherein the first receiving slot 21 of the first insulative housing 20 retains the first clip 133 of the first side arm 11 of the shell 1. The second insulative housing 40 is secured to the second side arm 12 of the shell 1, wherein the second receiving slot 43 securely retains the second clip 153 of the second side arm 12. The recess 41 of the second insulative housing 40 snugly engages with the first protruding block 22 of the first insulative housing 20, and the second protruding block 42 of the second insulative housing 40 is engagingly retained within the second securing hole 152 of the second side arm 12. The switch contacts 52 and 54 are respectively secured to the second insulative housing 40.

The ejecting mechanism is secured to the shell 1. One end of the first spring 613 is connected to the first securing hole 132 of the first side arm 11 and the other end thereof is connected to an end of the eject metal 612. The eject metal 612, the slide bar 611 and the first cam 614 are insert molded together and then the combination is received in the second securing portion 142. The slide bar 611 can slide along the slot 142*a* of the second securing portion 142. The push bar 621 is received in the first securing portion 141 for a guiding movement. The control rod 626 and the second spring 622 are loaded into the chamber 621*a* of the push bar 621 in sequence and then the chamber 621*a* is sealed by the cap 627. The second cam 624 is set into the third securing potion 144 and mounted between two second stopping tabs 144*a*. The third spring 623 is put into the square securing portion 143, with one end thereof wrapping about the post 621*b* and the other end thereof pressing against the first stopping plate 143*a*. Then the connector 1 is soldered to the PCB.

Figure 5:
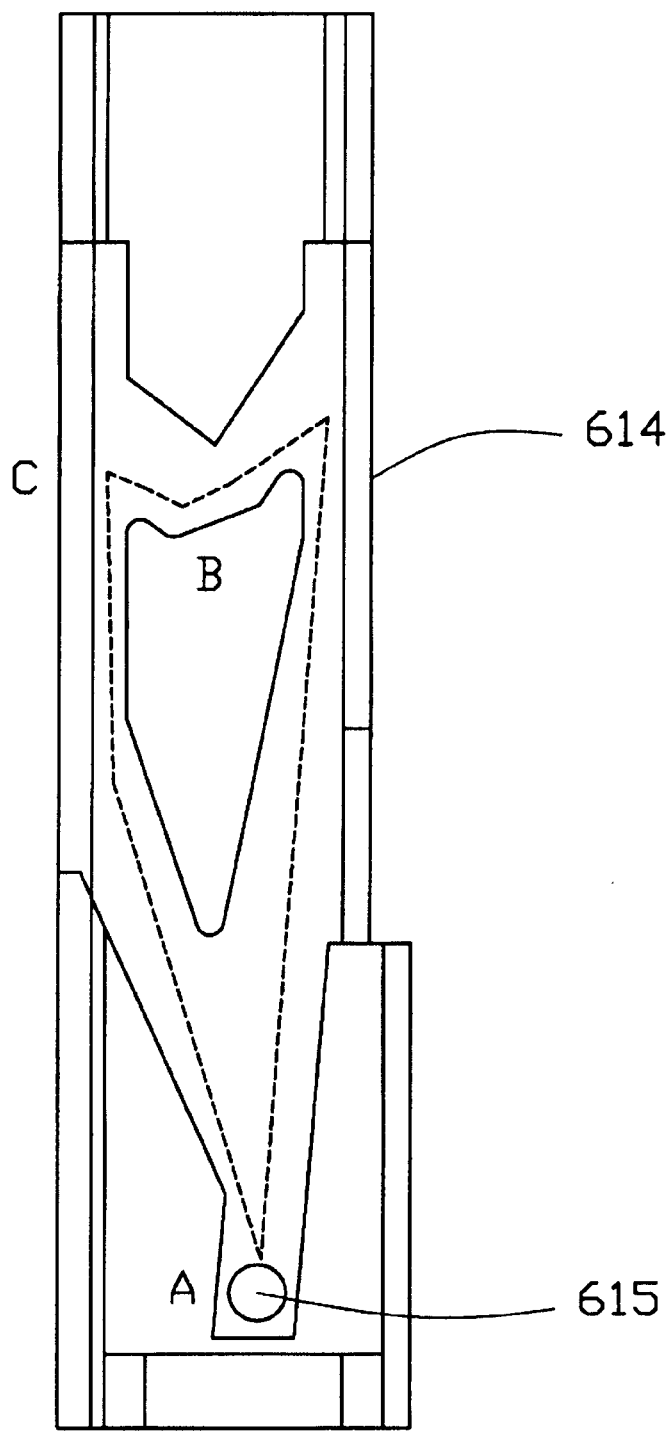
FIG. 5 partial, enlarged side elevational view of a cam in FIG. 1, wherein a broken line shows the moving track of a cam follower of the memory card connector of FIG. 1.

Referring to FIG. 5, in use, during inserting the memory card into the receiving space, first, the card pushes the eject metal 612 and urges the slide bar 611 to slide forwardly along the slot 142*a* against the spring force from the first spring 613. Meanwhile the first cam follower 615 slides from the original position "A" to the locked position "B" of the first cam 614 and, upon releasing the pushing force on the card, is locked at the position "B", thereby locking the eject metal 612 to the cam follower 615. This completes insertion of the memory card. To eject the memory card, the push bar 621 is pressed so the control rod 626 loaded in the chamber 621*a* of the push bar 621 impacts the slide bar 611 and drags it to slide ahead until the notch 626*a* of the control rod 626 contacts with the bevel of the projecting tab 134 of the shell 1 and is squeezed into the chamber 621*a*. At the same time and within the short distance that the slide bar 611 slides forwardly, the first cam follower 615 is urged to slide along the first cam 614 from the locked position "B" to the furthest position "C" and back to the original position "A". Meanwhile the eject metal 612 moves back, the first spring 613 restores to its original state, and the memory card is ejected. Moreover, the push bar 621 is locked to the second cam 624 by engagement between the second cam 624 and the second cam follower 625. Pressing the push bar 621 again will bring it back to its original position for another service. Although not specifically shown, it is noted that the second cam 624 has a groove design that is similar to that shown in FIG. 5.

The advantage of the present invention is that the second device 62 alleviates the need for a user to directly push the rear end of the memory card to eject the card when the card is completely received into the receiving space. It is therefore easy for the user to eject the memory card simply by pressing the push bar 621 of the second device 62.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. A memory card connector for ejecting a memory card, comprising:

a shell including a first side arm and a second side arm, the first side arm having a projecting tab;

an insulative frame being secured to the shell;

a plurality of conductive contacts mounted to the insulative frame; and an ejecting mechanism secured to the first side arm of the shell and including a first device and a second device, the first device including an eject metal, a slide bar, a first spring disposed between the first side arm and the eject metal, a first cam and a first cam follower engaging with the first cam, the second device including a push bar, a control rod loaded in the push bar, a second cam and a second cam follower engaging with the second cam;

during ejecting the memory card, the push bar being pressed to enable the control rod to impact and drag the slide bar to slide ahead until the control rod contacts with the projecting tab of the shell and is squeezed into the push bar, at the same time and within the short distance that the slide bar slides ahead, the first cam being moved by the slide bar to slide with respect to the first cam follower, thereby unlocking the eject metal to eject the memory card.

2. The memory card connector as claimed in claim 1, wherein the projecting tab has a bevelled front end.

3. The memory card connector as claimed in claim 2, wherein the control rod has a notched front end for being moveably engaged by the bevelled front end of the projecting tab.

4. The memory card connector as claimed in claim 1, wherein the push bar is slidably mounted to the first side arm.

5. The memory card connector as claimed in claim 1, wherein the first side arm defines a slot therein, and the slide bar is confined to slide within the slot.

6. The memory card connector as claimed in claim 1, wherein the push bar has a chamber at a front end thereof and a post protruding forwardly, and wherein the second device of the ejecting mechanism includes a second spring, a third spring and a cap, the control rod and the second spring being loaded into the chamber of the push bar in sequence and then the chamber being sealed by the cap, one end of the third spring wrapping about the post and the other end thereof pressing against the first side arm.

7. A memory card connector comprising:

a shell including a first side arm and a second side arm, the first side arm having a projecting tab;

an insulative frame being secured to the shell;

a plurality of conductive contacts mounted to the insulative frame; and an ejecting mechanism secured to the first side arm of the shell and including a first device and a second device, the first device including an eject metal, a slide bar, a first spring disposed between the first side arm and the eject metal, a first cam and a first cam follower engaging with the first cam, the second device including a push bar, a control rod loaded in the push bar, a second cam and a second cam follower engaging with the second cam;

after a memory card is ejected completely, the push bar being locked by engagement of the second cam and the second cam follower, a subsequent pressing operation of the push bar withdrawing it to move backward to enable the control rod to contact with the projecting tab of the shell and be squeezed into the push bar and therefore to slide over the slide bar, thereby bringing the push bar back to its original position for another service without affecting the first device.

8. The memory card connector as claimed in claim 7, wherein the projecting tab has a bevelled front end.

9. The memory card connector as claimed in claim 8, wherein the control rod has a notched front end for being moveably engaged by the bevelled front end of the projecting tab.

10. The memory card connector as claimed in claim 7, wherein the push bar is slidably mounted to the first side arm.

11. The memory card connector as claimed in claim 7, wherein the push bar has a chamber at a front end thereof and a post protruding forwardly, and wherein the second device of the ejecting mechanism includes a second spring, a third spring and a cap, the control rod and the second spring being loaded into the chamber of the push bar in sequence and then the chamber being sealed by the cap, one end of the third spring wrapping about the post and the other end thereof pressing against the first side arm.

12. A card connector assembly comprising:

a shell defining opposite first and second side arms;

an insulative housing assemble to said shell with a plurality of conductive contacts thereof;

an ejection mechanism attached to said first side arm, said ejection mechanism including correlated first and second device, said first device including an eject metal moved along with a slide bar which is moved along a front-to-back direction in a range defined by a first cam and a first cam follower, said second device including a push bar including means for alternately engaging the slide bar, said push bar moveable along said front-to-back direction within a range defined by a second cam and a second cam follower; wherein said eject metal is pushed to move forwardly by an inserted electronic card and retained in an inner position due to engagement between the first cam and the first cam follower, while is released therefrom to be ejected rearward/outwardly with said inserted card by pushing forwardly said push bar which moves said slide bar when said push bar and said slide bar are engaged with each other.

13. The assembly as claimed in claim 12, wherein a projecting tab is formed on said first side arm for disengaging said push bar from said slide bar during forward movement of said push bar.

* * * * *